(12) United States Patent
Morita et al.

(10) Patent No.: US 12,742,086 B2
(45) **Date of Patent: *Sep. 22, 2026**

(54) AQUEOUS INK JET INK COMPOSITION AND INK JET RECORDING METHOD

(71) Applicant: SEIKO EPSON CORPORATION, Tokyo (JP)

(72) Inventors: Keisuke Morita, Shiojiri (JP); Kunihiro Fujita, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 481 days.

This patent is subject to a terminal disclaimer.

(21) Appl. No.: 18/476,532

(22) Filed: Sep. 28, 2023

(65) Prior Publication Data

US 2024/0124734 A1 Apr. 18, 2024

(30) Foreign Application Priority Data

Sep. 29, 2022 (JP) ................................ 2022-156693

(51) Int. Cl.

*C09D 11/38* (2014.01)
*B41J 2/165* (2006.01)
*C09D 11/033* (2014.01)
*C09D 11/037* (2014.01)
*C09D 11/102* (2014.01)
*C09D 11/326* (2014.01)

(52) U.S. Cl.

CPC ............... *C09D 11/38* (2013.01); *B41J 2/165* (2013.01); *C09D 11/033* (2013.01); *C09D 11/037* (2013.01); *C09D 11/102* (2013.01); *C09D 11/326* (2013.01)

(58) Field of Classification Search

CPC ...................................................... C09D 11/38
See application file for complete search history.

(56) References Cited

U.S. PATENT DOCUMENTS

2015/0022584 A1 1/2015 Yamazaki et al.
2015/0175825 A1 6/2015 Yamazaki et al.
2018/0142110 A1* 5/2018 Maeda ................. C09D 11/106
2020/0009880 A1 1/2020 Yamazaki et al.
2020/0009890 A1 1/2020 Yamazaki et al.
2020/0332139 A1 10/2020 Kumeta et al.
2020/0385593 A1* 12/2020 Uchizono .............. B41J 2/2107
2021/0198507 A1 7/2021 Kumeta et al.

FOREIGN PATENT DOCUMENTS

EP 0616017 A2 9/1994
JP H04-202572 A 7/1992
JP H06-279718 A 10/1994

(Continued)

OTHER PUBLICATIONS

Okada et al. (JP 2013-184998) English machine translation (Year: 2013).*

(Continued)

*Primary Examiner* — Michael F Pepitone
(74) *Attorney, Agent, or Firm* — Harness, Dickey & Pierce, P.L.C.

(57) ABSTRACT

An aqueous ink jet ink composition includes a coloring material, a betaine, an acetylene glycol-based surfactant, and a water-soluble urethane resin.

13 Claims, 1 Drawing Sheet

(56) References Cited

FOREIGN PATENT DOCUMENTS

| | | | | |
|---|---|---|---|---|
| JP | 2013184998 | A | * | 9/2013 |
| JP | 2015-021031 | A | | 2/2015 |
| JP | 2020-006556 | A | | 1/2020 |
| JP | 2020-007444 | A | | 1/2020 |
| JP | 2020-019875 | A | | 2/2020 |
| JP | 2025012011 | A | * | 1/2025 |

OTHER PUBLICATIONS

Hirabayashi et al. (JP 2025-12011) English machine translation (Year: 2025).*

* cited by examiner

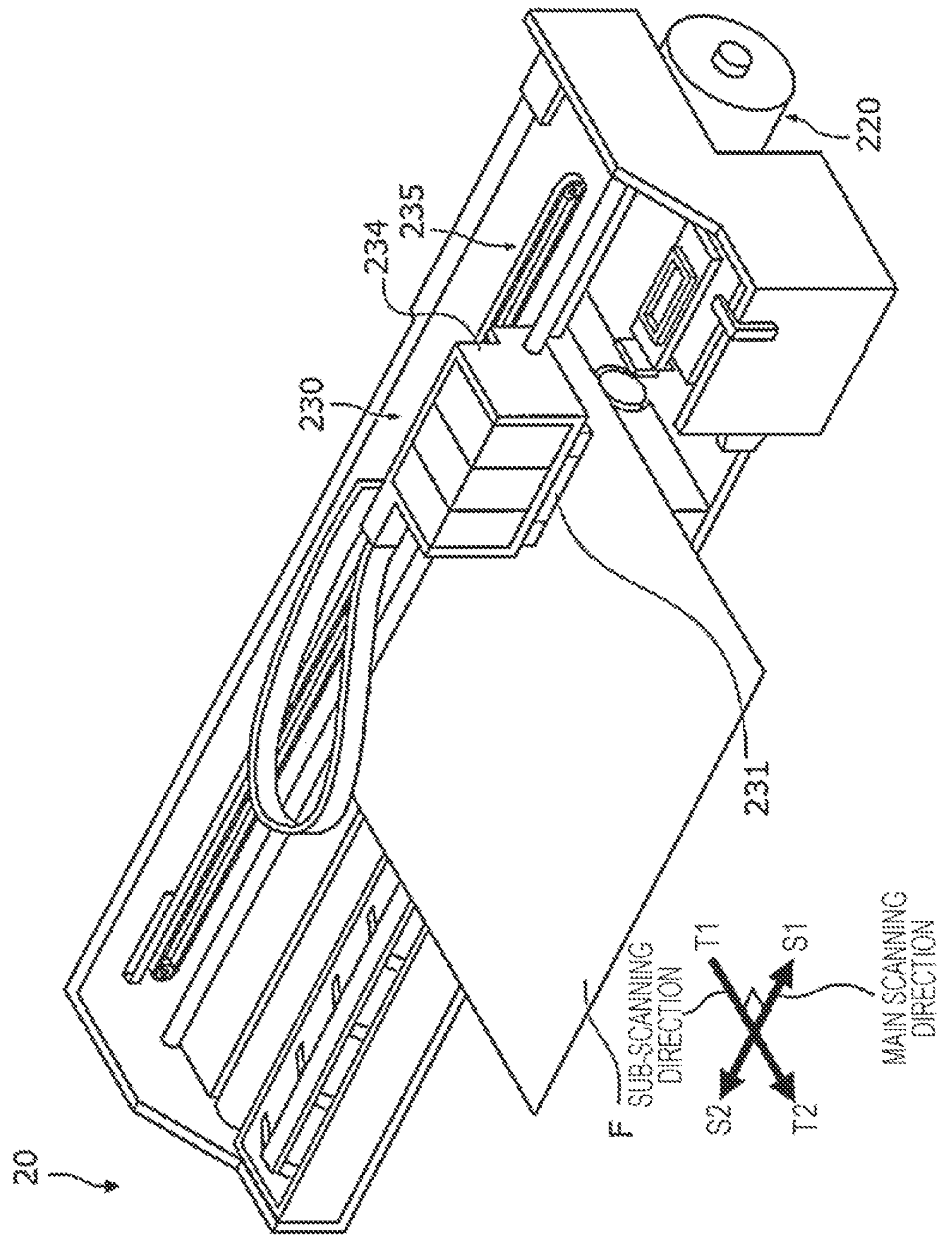
20
220
235
234
230
231
F
SUB-SCANNING DIRECTION
MAIN SCANNING DIRECTION
T1
S1
S2
T2

AQUEOUS INK JET INK COMPOSITION AND INK JET RECORDING METHOD

The present application is based on, and claims priority from JP Application Serial Number 2022-156693, filed Sep. 29, 2022, the disclosure of which is hereby incorporated by reference herein in its entirety.

BACKGROUND

1. Technical Field

The present disclosure relates to an aqueous ink jet ink composition and an ink jet recording method.

2. Related Art

An ink jet recording method can record high-definition images by a relatively simple apparatus, and is rapidly developed in various fields. On the other hand, an ink jet recording method has a problem of easily causing a flying curve and non-ejection due to ink drying and thickening in nozzles. Therefore, various investigations are performed for improving ink performance such as intermittency, clogging recoverability, etc. For example, JP-A-2020-7444 discloses an ink for ink jet recording, which contains a pigment, colloidal silica, an acetylene glycol-based surfactant, and trimethyl glycine as a betaine.

However, it is found that when a betaine is applied to an ink containing an acetylene glycol-based surfactant, intermittency and clogging recoverability are easily decreased.

SUMMARY

An ink jet ink composition according to the present disclosure is an aqueous ink jet ink composition containing a coloring material, a betaine, an acetylene glycol-based surfactant, and a water-soluble urethane resin.

An ink jet recording method according to the present disclosure is a recording method including an ink adhesion step of ejecting and adhering the ink jet ink composition from an ink jet head to a recording medium.

BRIEF DESCRIPTION OF THE DRAWING

FIGURE is a drawing showing an example of a recording apparatus used in an embodiment of the present disclosure.

DESCRIPTION OF EMBODIMENTS

An embodiment of the present disclosure (referred to as a "present disclosure" hereinafter) is described in detail below, but the present disclosure is not limited to the embodiment and various modification can be made within a range not deviating from the gist of the present disclosure.

1. Ink Jet Ink Composition

An aqueous ink jet ink composition (also simply referred to as an "ink composition" hereinafter) according to a present disclosure is an aqueous ink jet ink composition containing a coloring material, a betaine, an acetylene glycol-based surfactant, and a water-soluble urethane resin.

The betaine is an excellent moisturizer and can suppress the occurrence of a flying curve and non-ejection (decrease in intermittency) when the ink is dried and thickened in nozzles. On the other hand, it is found that when the ink composition contains an acetylene glycol-based surfactant, the betaine tends to decrease compatibility between the acetylene glycol-based surfactant and water. In particular, drying of the ink composition easily causes phase separation between the acetylene glycol-based surfactant and water, and thus the ink is hardly ejected from nozzles. Therefore, the ink is not ejected or a flying curve remains even when the ink is ejected, thereby making poor the clogging recoverability. In particular, when an ink jet head is allowed to stand without being capped for a long time, phase separation of the acetylene glycol-based surfactant easily occurs, and the clogging recoverability is easily made poor.

The technical mechanism of phase separation between the acetylene glycol-based surfactant and water is not particularly limited, but is considered as follows. The betaine has strong hydrophilicity, and thus there occurs a state where many water molecules are hydrated to the betaine. When drying of the ink composition proceeds to decrease moisture, there occurs a state where the amount of water molecules hydrated to the betaine is relatively large. It is thus considered that the acetylene glycol-based surfactant originally has low solubility in water and is more hardly dissolved in a phase in which the betaine is hydrated with water, thereby causing phase separation of the acetylene glycol-based surfactant.

Thus, in the present embodiment, the ink composition contains the water-soluble urethane resin, and thus even when the ink composition contains the betaine and the acetylene glycol-based surfactant, the phase separation of the acetylene glycol-based surfactant can be suppressed, and thus intermittency and clogging recoverability are excellent.

When the ink composition containing the betaine and the acetylene glycol-based surfactant contains the water-soluble urethane resin, the technical mechanism of improvement in intermittency and clogging recoverability is not particularly limited, but is considered as follows. When the ink composition contains the water-soluble urethane resin, the acetylene glycol-based surfactant can be adsorbed by the water-soluble urethane resin. Thus, it is considered that even when drying of the ink composition proceeds, phase separation of the acetylene glycol-based surfactant does not easily occur.

Each of the components of the ink composition of the present embodiment is described in detail below.

1. 1. Coloring Material

Examples of the coloring material include, but are not particularly limited to, a dye, a pigment, and the like, and among these, a pigment is preferably used from the viewpoint of a wide range of usable recording media and the property of producing little discoloration with light, gas, and the like, etc.

Examples of the pigment include, but are not particularly limited to, organic pigments such as azo pigments (for example, an azo lake, an insoluble azo pigment, a condensed azo pigment, a chelate azo pigment, and the like), polycyclic pigments (for example, a phthalocyanine pigment, a perylene pigment, a perinone pigment, an anthraquinone pigment, a quinacridone pigment, a dioxazine pigment, a thioindigo pigment, an isoindolinone pigment, a quinophthalone pigment, and the like), a nitro pigment, a nitroso pigment, aniline black, and the like; inorganic pigments such as carbon black (for example, furnace black, thermal lamp black, acetylene black, channel black, and the like), metal oxides, metal sulfides, metal chlorides, and the like; extender pigments such as silica, calcium carbonate, talc, and the like; and the like. The pigments may be used alone or in combination of two or more.

Other examples of the pigment include, but are not particularly limited to, a self-dispersing pigment having a hydrophilic group introduced into pigment particle surfaces by using chemical reaction, a resin-dispersed pigment, and the like.

The resin-dispersed pigment is a pigment dispersed by a resin. The resin used for dispersing a pigment is also referred to as a "dispersant resin". The dispersant resin represents a resin used by applying to pigment surfaces for improving the water dispersibility of the pigment. The resin-dispersed pigment is a pigment including the dispersant resin adsorbed, adhered, or coated on the pigment.

A water-soluble resin or a water-insoluble resin can be used as the dispersant resin. The resin-dispersed pigment can be prepared by a method of dispersing a pigment by stirring the dispersant resin and the pigment in water, a method of stirring the dispersant resin and the pigment in an organic solvent and then performing transfer emulsification with a water phase, or the like.

The self-dispersing pigment is a pigment having a functional group for improving water dispersibility of the pigment, which is introduced to the pigment surfaces directly or indirectly by chemical bonding. The functional group is a hydrophilic group, and examples thereof include a carboxyl group, a sulfo group, phosphorus-containing groups such as a phosphate group, and the like, and the like.

The pigment preferably contains any one or more of the self-dispersing pigment and the pigment dispersed by the dispersant resin, and more preferably contains the self-dispersing pigment. When the dispersant resin or another dispersant is used, the dispersants may be used alone or in combination of two or more.

The content of the coloring material relative to the total amount of the ink composition is preferably from 1.0% to 14% by mass, more preferably from 2.0% to 12% by mass, still more preferably from 4.0% to 10% by mass, and even still more preferably from 6.0% to 8.0% by mass.

1. 2. Betaine

The betaine represents a compound which has a positive charge and a negative charge at positions non-adjacent to each other in one molecule, in which dissociable hydrogen is not bonded to an atom having positive charge, and which constitutes an intramolecular salt and does not have a charge as a whole molecule. The betaine of the present embodiment preferably has a quaternary ammonium cation as a positive charge site.

When the ink composition contains the betaine, the flying curve and non-ejection of the ink composition can be prevented from being caused by drying of the ink composition in nozzles of an ink jet head, and thus intermittency tends to be made excellent. The "intermittency" represents a degree in which drying of the ink in nozzles, not ejecting the ink, proceeds during recording and causes the non-ejection and flying curve due to thickening of the ink.

Examples of the betaine include, but are not particularly limited to, trimethyl glycine, γ-butyrobetaine, homarine, trigonelline, carnitine, homoserine betaine, valine betaine, lysine betaine, ornithine betaine, alanine betaine, stachydrine, glutamic acid betaine, and the like. Among these, any one or more of trimethyl glycine, γ-butyrobetaine, and carnitine are preferably contained, and any one or more of trimethyl glycine and γ-butyrobetaine are more preferably contained. This tends to more improve the clogging recoverability. The betaines may be used alone or in combination of two or more.

The number of carbons constituting the betaine is preferably 4 to 12, more preferably 4 to 7, and still more preferably 4 to 6. When the number of carbons of the betaine is within the range described above, the stability to mixing of charge foreign materials or the like tends to be more improved.

The content of the betaine relative to the total amount of the ink composition is preferably 1.0% by mass or more, and further preferably from 3.0% to 13% by mass, more preferably from 5.0% to 10% by mass, still more preferably from 6.0% to 9.0% by mass, and even still more preferably from 6.0% to 8.0% by mass. When the content of the betaine is 3.0% by mass or more, ejection stability and curling resistance tend to be excellent, and when the content of the betaine is 13% by mass or less, there is a tendency that the phase separation of the acetylene glycol-based surfactant in the ink composition can be suppressed, thereby improving the clogging recoverability.

1. 3. Acetylene Glycol-Based Surfactant

When the ink composition contains the acetylene glycol-based surfactant, the ink composition ejected from nozzles is easily formed into droplets and thus can be satisfactorily continuously and stably ejected. That is, ejection is stabilized. This can prevent non-ejection of the ink from nozzles and the occurrence of a flying curve.

In addition, when ejection is unstable because the ink composition does not contain the acetylene glycol-based surfactant, ejection tends to be unstable from the beginning regardless of the presence of drying of the ink in nozzles.

Also, when the ink composition contains the acetylene glycol-based surfactant, there is a tendency to improve the wet-spreading property and permeability of the ink composition and achieve excellent image quality and color development particularly in recording on an absorptive recording medium such as plain paper or the like.

Examples of the acetylene glycol-based surfactant include, but are not particularly limited to, acetylene glycol and alkylene oxide adducts thereof, and specifically it is represented by formula (1) below.

(1)

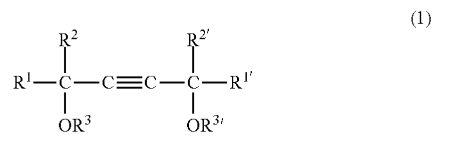

In the formula (1), $R^1$, $R^{1'}$, $R^2$, and $R^{2'}$ each independently represent a linear or branched alkyl group having 1 to 5 carbon atoms, and —$OR^3$ and —$OR^{3'}$ each independently represent —OH or —$O(C_mH_{2m}O)_nH$. Herein, m represents an integer of 1 to 5. In addition, n is a value of 0.5 to 25 including a decimal and represents the average degree of polymerization of alkylene oxide ($C_mH_{2m}O$) added.

The number of carbon atoms in a main chain of a compound represented by the formula (1) is preferably any one of 8, 10, 12, and 14, more preferably 10 or 12, and still more preferably 10.

In the present specification, the "main chain" represents a main chain of acetylene glycol, which is determined based on the nomenclature of IUPAC. The acetylene glycol-based surfactants may be used alone or in combination of two or more.

Further, $R^1$ and $R^{1'}$ are each preferably a linear alkyl group having 1 to 5 carbon atoms, more preferably a linear alkyl group having 2 to 4 carbon atoms, and still more preferably a linear propyl group.

Further, $R^2$ and $R^{2\prime}$ are each preferably a linear alkyl group having 1 to 5 carbon atoms, more preferably a linear alkyl group having 1 to 3 carbon atoms, and still more preferably a methyl group.

In addition, m is preferably 1 to 4, more preferably 2 to 3, and still more preferably 2. Also, n is preferably 4 to 20, more preferably 6 to 16, and still more preferably 8 to 12.

In addition, $—OR^3$ and $—OR^{3\prime}$ each preferably represent —OH and both $—OR^3$ and $—OR^{3\prime}$ preferably represent —OH.

More specific structures of the acetylene glycol-based surfactant include, but are not particularly limited to, 2,5,8,11-tetramethyl-6-dodecine-5,8-diol or alkylene oxide adducts thereof, 5,8-dimethyl-6-dodecine-5,8-diol or alkylene oxide adducts thereof, 2,4,7,9-tetramethyl-5-decine-4,7-diol or alkylene oxide adducts thereof, and 4,7-dimethyl-5-decine-4,7-diol or alkylene oxide adducts thereof.

Among the acetylene glycol-based surfactants, a compound in which $—OR^3$ and $—OR^3$-' in the formula (1) are —OH is preferred, particularly, because of the excellent wet spreading property of the ink composition on a recording medium and particularly excellent image quality, while the solubility in water tends to be particularly poor. Therefore, the ink composition of the present embodiment is particularly useful.

The content of the acetylene glycol-based surfactant relative to the total amount of the ink composition is from 0.1% to 5.0% by mass, more preferably from 0.1% to 3.5% by mass, still more preferably from 0.2% to 2.5% by mass, and even still more preferably from 0.3% to 1.2% by mass. When the content of the acetylene glycol-based surfactant is 0.1% by mass or more, ejection stability tends to be improved, while when the content of the acetylene glycol-based surfactant is 5.0% by mass or less, there is a tendency to easily prevent the phase separation of the acetylene glycol-based surfactant in the ink composition and to improve ejection stability.

1. 4. Water-Soluble Urethane Resin

The water-soluble urethane resin represents a water-soluble urethane resin having a polar group in the molecular structure thereof. The polar group may be in a salt state. Also, the polar group is preferably an acid group. Examples of the acid group include a carboxyl group, a sulfonate group, a phosphorus-containing group such as a phosphate group or the like, and the like.

In the present disclosure, the "water-soluble resin" represents a resin which is dissolved in water or an aqueous medium as a mixed solvent of water and a water-soluble organic solvent, and which can be present in water or an aqueous medium in a state not having a particle diameter measured by a dynamic light-scattering method.

As described above, when the ink composition contains the acetylene glycol-based surfactant, there is a tendency that the progress of drying of the ink composition causes phase-separation of the acetylene glycol-based surfactant from water because the acetylene glycol-based surfactant has low solubility in water or the like, and thus intermittency and the clogging recoverability are easily decreased. However, the ink composition of the present embodiment contains the water-soluble urethane resin, and thus has a tendency that the phase separation can be prevented, and excellent intermittency and clogging recoverability are exhibited.

The water-soluble urethane resin has a repeating unit derived from polyisocyanate and polyol, and is preferably a resin having a repeating unit derived from polyol having an acid group. Further, preferred is a resin having a repeating unit derived from each of polyisocyanate, polyol not having an acid group, and polyol having an acid group. The water-soluble urethane resin may further have a repeating unit derived from polyamine.

The "polyisocyanate" represents a compound having two or more isocyanate groups in its molecular structure, and examples thereof include, but are not particularly limited to, aliphatic polyisocyanate, aromatic polyisocyanate, and the like.

Examples of the aliphatic polyisocyanate include, but are not particularly limited to, polyisocyanates having a chain structure, such as tetramethylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate, 3-methylpentane-1,5-diisocyanate, and the like; polyisocyanates having a cyclic structure, such as isophorone diisocyanate, hydrogenated xylylene diisocyanate, 4,4'-dicyclohexylmethane diisocyanate, 1,4-cyclohexane diisocyanate, methylcyclohexylene diisocyanate, 1,3-bis(isocyanatomethyl)cyclohexane, and the like; and the like.

Examples of the aromatic polyisocyanate include, but are not particularly limited to, tolylene diisocyanate, 2,2'-diphenylmethane diisocyanate, 2,4'-diphenylmethane diisocyanate, 4,4'-diphenylmethane diisocyanate, 4,4'-dibenzyl diisocyanate, 1,5-naphthylene diisocyanate, xylylene diisocyanate, 1,3-phenylene diisocyanate, 1,4-phenylene diisocyanate, dialkyl diphenylmethane diisocyanate, tetraalkyl diphenylmethane diisocyanate, α,α,α',α'-tetramethylxylylene diisocyanate, and the like.

The polyol is a compound having two or more hydroxyl groups in its molecular structure. Examples of the polyol of the present embodiment include, but are not particularly limited to, polyol not having an acid group, and polyol having an acid group.

Examples of the polyol not having an acid group include, but are not particularly limited to, polyether polyol, polyester polyol, polycarbonate polyol, and the like.

Examples of the polyether polyol include, but are not particularly limited to, addition polymers of alkylene oxide and polyols, glycols, and the like.

Examples of the alkylene oxide include, but are not particularly limited to, ethylene oxide, propylene oxide, butylene oxide, α-olefin oxide, and the like. Examples of the polyols, which are addition-polymerized with alkylene oxide, include diols such as 1,3-propanediol, 1,3-butanediol, 1,4-butanediol, 1,5-pentanediol, 1,6-hexanediol, 3-methyl-1,5-pentanediol, 2-butyl-2-ethyl-1,3-propanediol, 1,4-cyclohexanediol, 1,4-cyclohexanedimethanol, 4,4-dihycroyphenylpropane, 4,4-dihydroxyphenylmethane, hydrogenated bisphenol A, dimethylol urea, and derivatives thereof, and the like; glycerin, trimethylolpropane, 1,2,5-hexanetriol, 1,2,6-hexanetriol, pentaerythritol, trimethylol melamine, and derivatives thereof; triol such as polyoxypropylenetriol and the like; and the like.

Examples of the glycols include (poly)alkylene glycols such as tetramethylene glycol, hexamethylene glycol, ethylene glycol, diethylene glycol, triethylene glycol, tetraethylene glycol, polyethylene glycol, propylene glycol, dipropylene glycol, tripropylene glycol, polypropylene glycol, (poly)tetramethylene glycol, and the like; a copolymer of ethylene glycol and propylene glycol; and the like.

The polyester polyol is not particularly limited, but is for example an acid ester or the like. Examples of an acid component constituting an acid ester include, but are not particularly limited to, aromatic dicarboxylic acids such as phthalic acid, naphthalene dicarboxylic acid, biphenyl dicarboxylic acid, tetrahydrophthalic acid, and the like; alicyclic dicarboxylic acids such as hydrogenated products of these aromatic dicarboxylic acids; aliphatic dicarboxylic acids such as malonic acid, succinic acid, tartaric acid, oxalic acid, glutaric acid, adipic acid, pimelic acid, suberic acid, azelaic acid, sebacic acid, alkylsuccinic acid, linoleic acid, maleic acid, fumaric acid, mesaconic acid, citraconic acid, itaconic acid, and the like; and the like. Also, acid anhydrides, salts, derivatives (alkyl esters and acid halides), and the like of these acids can be used. In addition, examples of a component which forms an ester with the acid component include, but are not particularly limited to, polyols such as diol, triol, and the like; glycols such as (poly)alkylene glycol and the like; and the like. Examples of the polyols and glycols include the same examples as those of the component constituting the polyether polyol.

The polycarbonate polyol is not particularly limited, but, for example, polycarbonate polyol produced by a known method can be used. Specific examples thereof include alkanediol-based polycarbonate polyol such as polyhexamethylene carbonatediol and the like. Other examples include polycarbonate diol produced by reacting a carbonate component, such as alkylene carbonate, diaryl carbonate, dialkyl carbonate, or the like and phosgene with an aliphatic diol component, and the like.

Examples of the polyol having an acid group include, but are not particularly limited to, polyol having an acid group such as a carboxylate group, a sulfonate group, a phosphate group, a phosphonate group, or the like, and the like. Among these, any one or more of a carboxyl group, a sulfonate group, and a phosphorus-containing group such as a phosphate group or the like, are preferred, and a carboxyl group is more preferred.

Examples of a polyol having a carboxylate group include, but are not particularly limited to, dimethylol acetic acid, dimethylol propionic acid, dimethylol butanoic acid, dimethylol butyric acid, and the like.

The acid group of the polyol having an acid group may be in a salt state. Examples of a cation which forms such a salt include, but are not particularly limited to, alkali metal ions, organic amine cations, and the like. Examples of alkali metal ions include, but are not particularly limited to, lithium, sodium, potassium, and the like. Examples of organic amine cations include, but are not particularly limited to, ammonium ion, dimethylamine, and the like.

Examples of polyamine include, but are not particularly limited to, monoamines having a plurality of hydroxyl groups, such as dimethylol ethylamine, diethanol methylamine, dipropanol ethylamine, dibutanol methylamine, and the like; difunctional polyamines such as ethylene diamine, propylene diamine, hexylene diamine, isophorone diamine, xylylene diamine, diphenylmethane diamine, hydrogenated diphenylmethane diamine, hydrazine, and the like; tri- or higher-functional polyamines such as diethylene triamine, triethylene tetramine, tetraethylene pentamine, polyamide polyamine, polyethylene polyimine, and the like; and the like.

The acid value of the water-soluble urethane resin is preferably 40 to 100 mgKOH/g, more preferably 40 to 90 mgKOH/g, still more preferably 45 to 80 mgKOH/g, and even still more preferably 50 to 70 mgKOH/g. The acid value of the water-soluble urethane resin is not particularly limited, but can be adjusted by, for example, the use amount of polyol having an acid group. In addition, a method described in examples below can be used as a method for measuring the acid value.

The weight-average molecular weight of the water-soluble urethane resin is preferably 5000 to 150000, more preferably 10000 to 100000, still more preferably 15000 to 50000, even still more preferably 20000 to 30000, and even still more preferably 20000 to 23000. The weight-average molecular weight within the range described above tends to more improve ejection reliability. The weight-average molecular weight of the water-soluble urethane resin is not particularly limited, but can be adjusted by, for example, the temperature, time, etc. of reaction of polyisocyanate and polyol. In addition, a method described in examples below can be method as a method for measuring the weight-average molecular weight.

The number-average molecular weight of the water-soluble urethane resin is preferably 2000 to 7000 and more preferably 3500 to 5000. The number-average molecular weight within the range described above tends to more improve ejection reliability. The number-average molecular weight of the water-soluble urethane resin is not particularly limited, but can be adjusted by, for example, the temperature, time, etc. of reaction of polyisocyanate and polyol. In addition, a method described in examples below can be method as a method for measuring the number-average molecular weight.

The content of the water-soluble urethane resin relative to the total amount of the ink composition is preferably 0.05% by mass or more, more preferably from 0.1% to 5.0% by mass, still more preferably from 0.1% to 4.0% by mass, even still more preferably from 0.2% to 3.0% by mass, further even still more preferably from 0.3% to 2.0% by mass, further even still more preferably from 0.3% to 1.0% by mass, and further even still more preferably from 0.4% to 0.8% by mass. When the content of the water-soluble urethane resin is within or higher than the range described above, the intermittency and clogging recoverability tend to be more excellent, while when the content of the water-soluble urethane resin is within or lower than the range described above, the intermittency tends to be more excellent.

The ratio (mass ratio) of the content of the water-soluble urethane resin to the content of the acetylene glycol-based surfactant is preferably from 0.05 to 7.0, more preferably from 0.1 to 5.0, still more preferably from 0.1 to 2.5, even still more preferably from 0.2 to 1.5, and further even still more preferably from 0.5 to 1.0. When the ratio of the content of the water-soluble urethane resin to the content of the acetylene glycol-based surfactant is within the range described above, the intermittency and clogging recoverability tend to be more excellent.

1. 5. Resin-Dispersed Particles

The ink composition of the present embodiment may contain or not contain resin-dispersed particles, and preferably contains the resin-dispersed particles. The resin of the resin-dispersed particles is a resin containing resin particles dispersed in a solvent in an ink, but not a water-soluble resin. For example, a resin emulsion or the like can be used.

Examples of the resin-dispersed particles include, but are not particularly limited to, resin particles composed of a urethane-based resin, an acrylic resin, a fluorene-based resin, a polyolefin-based resin, a rosin-modified resin, a terpene-based resin, a polyester-based resin, a polyamide-based resin, an epoxy-based resin, a vinyl chloride-based resin, an ethylene-vinyl aetate-based resin, or the like. These resin particles are preferably used in an emulsion form from the viewpoint of intermittency and clogging recoverability. These types of resin-dispersed particles may be used alone or in combination of two or more.

The urethane-based resin is a generic named of resins having a urethane bond, and examples thereof include, but are not particularly limited to, a polyether-type urethane resin having an ether bond in its main chain, a polyester-type urethane resin having an ester bond in its main chain, and a polycarbonate-type urethane resin having a carbonate bond in its main chain. The urethane-based resin may be a prepared product prepared by a known method, and a commercial product may be used.

The acrylic resin is a generic name of polymers produced by polymerizing at least an acrylic monomer as a component, such as a (meth)acrylic acid, a (meth)acrylate ester, or the like. Examples of the acrylic resin, but are not particularly limited to, a polymer of a (meth)acrylic monomer such as (meth)acrylic acid, (meth)acrylate ester, or the like, a copolymer of a (meth)acrylic monomer and another monomer, such as a styrene-acrylic resin or the like. The acrylic resin may be a prepared product prepared by a known method, and a commercial product may be used.

When the ink composition contains the resin-dispersed particles, the clogging recoverability tends to be improved. This is supposed to be because the resin-dispersed particles also have the tendency to suppress the phase separation between the acetylene glycol-based surfactant and water, thereby causing excellent clogging recoverability. On the other hand, when the ink contains the resin-dispersed particles, the intermittency tends to be decreased. This is supposed to be because the resin-dispersed particles themselves tend to cause thickening of the ink due to ink drying, thereby decreasing the intermittency.

The content of the resin-dispersed particles relative to the total amount of the ink composition is preferably 1.5% by mass or less, more preferably from 0.1% to 1.4% by mass, still more preferably from 0.2% to 1.2% by mass, even still more preferably from 0.3% to 0.8% by mass, and further even still more preferably from 0.4% to 0.6% by mass. When the content of the resin-dispersed particles is within or higher than the range described above, rub resistance and clogging recoverability tend to be more excellent. When the content of the resin-dispersed particles is within or lower than the range described above, aggregation of the resin-dispersed particles due to the betaine is easily suppressed when the ink composition is dried, and thus the intermittency and clogging recoverability tend to be excellent.

1. 6. Inorganic Oxide Particles

The ink composition of the present embodiment preferably contains inorganic oxide particles. The term "inorganic oxide particles" represents fine particles of an inorganic oxide in a state of being dispersed in a dispersion medium.

When the ink composition contains the inorganic oxide particles, curling resistance tends to be excellent. In addition, when the ink composition contains both the betaine and the inorganic oxide particles, curling resistance tends to be particularly excellent.

Examples of the inorganic oxide particles include, but are not particularly limited to, metal oxides such as silica, alumina, titania, zirconia, antinomy oxide, tin oxide, tantalum oxide, zinc oxide, cerium oxide, lead oxide, indium oxide, and the like; metal nitrides such as silicon nitride, titanium nitride, aluminum nitride, and the like; metal carbides such as silicon carbide, titanium carbide, and the like; metal sulfides such as zinc sulfide and the like; metal carbonate salts such as calcium carbonate, magnesium carbonate, and the like; metal sulfate salts such as calcium sulfate, magnesium sulfate, and the like; metal silicate salts such as calcium silicate, magnesium silicate, and the like; metal phosphate salts such as calcium phosphate and the like; metal borate salts such as aluminum borate, magnesium borate, and the like; composite compounds thereof; and the like. The inorganic oxide particles may form a salt. These types of inorganic oxide particles may be used alone or in combination of two or more.

In particular, from the viewpoint of improving the curling resistance, at least one or more of silica, alumina, titania, and zirconia are preferably contained, and silica is more preferably contained.

The average particle diameter of the inorganic oxide particles is preferably 100 nm or less, more preferably 20 to 100 nm, still more preferably 30 to 80 nm, and even still more preferably 40 to 60 nm. When the average particle diameter of the inorganic oxide particles is within the range described above, intermittency tends to be excellent.

The average particle diameter of the inorganic oxide particles can be measured by a particle size distribution measurement apparatus using a dynamic light scattering method as a measurement principle. The particle size distribution measurement apparatus is not particularly limited but is, for example, "Zeta potential-particle size-molecular weight measurement system ELSZ2000ZS" (trade name) manufactured by Otsuka Electronics Co., Ltd., using a homodyne optical system as a frequency analysis method. The "average particle diameter" represents a number-based average particle diameter.

The content of the inorganic oxide particles in terms of solid content mass relative to the total amount of the ink composition is preferably from 0.1% to 8.0% by mass, more preferably from 0.5% to 6.0% by mass, still more preferably from 1.0% to 5.0% by mass, and particularly preferably from 2.0% to 4.0% by mass. When the content of the inorganic oxide particles is 0.1% by mass or more, the curling resistance tends to be improved, while when the content of the inorganic oxide particles is 8.0% by mass or less, aggregation of the inorganic oxide particles due to the betaine tends to be easily suppressed when the ink composition is dried, thereby causing excellent intermittency and clogging recoverability.

1. 7. Lactam

The ink composition of the present embodiment preferably contains a lactam. Also, 1) the ink composition of the present embodiment more preferably contains at least one or more types of the resin-dispersed particles and the inorganic oxide particles, and the lactam, and 2) still more preferably contains at least one or more types of the resin-dispersed particles and the inorganic oxide particles, and the lactam, the lactam containing lactam A having 4 to 6 carbon atoms which constitute a lactam ring.

The term "lactam" represents a compound having a structure in which a ring is formed by dehydration condensation of a carboxyl group and an amino group in its molecule.

As described above, when the ink composition contains the inorganic oxide particles, the curling resistance tends to be excellent, while when the ink composition is dried, ejection stability tends to be made poor due to the aggregation of the inorganic oxide particles. The ink composition of the present embodiment contains the lactam in addition to the inorganic oxide particles, and thus the aggregation of the inorganic oxide particles can be dissolved, thereby creating a tendency to improve the intermittency and clogging recoverability.

Examples of the lactam include, but are not particularly limited to, a compound having 3 to 8 carbon atoms forming a lactam ring. In particular, lactam A having 4 to 6 carbon atoms forming a lactam ring is preferably contained. The lactam may or may not have a substituent in a lactam ring. For examples, a derivative having a substituent in a lactam ring and the like may be used.

Examples of a compound having 3 carbon atoms forming a lactam ring include, but are not particularly limited to, 2-acetidinone and a derivative thereof. Examples of a compound having 4 carbon atoms forming a lactam ring include, but are not particularly limited to, 2-pyrroline and a derivative thereof. Examples of a compound having 5 carbon atoms forming a lactam ring include, but are not particularly limited to, 2-piperdone and a derivative thereof. Examples of a compound having 6 carbon atoms forming a lactam ring include, but are not particularly limited to, ε-caprolactam and a derivative thereof. In particular, from the viewpoint of improving the ejection stability, ε-caprolactam and a derivative thereof are preferably contained, and ε-caprolactam is more preferably contained.

The lactam tends to suppress decreases in intermittency and clogging recoverability caused by the resin-dispersed particles. This is supposed to be because the aggregates of the resin-dispersed particles due to drying of the ink composition are dissolved by the lactam.

The ratio of the content of the resin-dispersed particles to the content of lactam A is preferably from 0.01 to 1.2, more preferably from 0.03 to 0.9, still more preferably from 0.05 to 0.6, and even still more preferably from 0.1 to 0.5. When the ratio of the content of the resin-dispersed particles to the content of the lactam A is 0.01 or more, the intermittency tends to be improved, while when the ratio of the content of the resin-dispersed particles to the content of the lactam A is 1.2 or less, the intermittency and clogging recoverability tend to be improved.

1. 8. Organic Solvent

The ink composition of the present embodiment may contain an organic solvent. Examples of the organic solvent include, but are not particularly limited to, monohydric alcohols, polyols, glycol ethers, and the like. Among these, polyols are more preferably contained, and polyols having a standard boiling point of over 280° C. are more preferably contained. The organic solvents may be used alone or in combination of two or more.

Examples of the monohydric alcohols include, but are not particularly limited to, methanol, ethanol, 1-propnanol, isopropanol, 1-butanol, 2-butanol, isobutanol, 2-methyl-2-propanol, and the like.

Examples of the glycol ethers include, but are not particularly limited to, triethylene glycol monomethyl ether, triethylene glycol dimethyl ether, triethylene glycol monobutyl ether, diethylene glycol monobutyl ether, dipropylene glycol monopropyl ether, and the like.

Examples of polyols having a standard boiling point of over 280° C., among polyalcohols, include, but are not particularly limited to, triethylene glycol, tetraethylene glycol, glycerin, and the like. Examples of polyols having a standard boiling point of 280° C. or less include, but are not particularly limited to, ethylene glycol, diethylene glycol, pentaethylene glycol, propylene glycol, dipropylene glycol, tripropylene glycol, 1,3-propanediol, 1,2-butandiol, 1,2-pentanediol, 1,2-hexanediol, 1,4-butanediol, 1,5-pentanediol, 1,6-hexanediol, and the like.

The content of the organic solvent relative to the total amount of the ink jet ink composition is preferably from 6.0% to 28% by mass, more preferably from 8.0% to 24% by mass, still more preferably from 10% to 20% by mass, and even still more preferably from 12% to 16% by mass.

1. 9. Alkali

The ink composition of the present embodiment may contain an alkali. Examples of the alkali include, but are not particularly limited to, an organic base and an inorganic base. Examples of the organic base include, but are not particularly limited to, triethanolamine, diethanolamine, monoethanolamine, tripropanolamine, and the like. Examples of the inorganic base include, but are not particularly limited to, lithium hydroxide, sodium hydroxide, potassium hydroxide, and the like.

The content of the alkali relative to the total amount of the ink jet ink composition is preferably from 0.01% to 1.0% by mass, more preferably from 0.01% to 0.5% by mass, still more preferably from 0.03% to 0.3% by mass, and even still more preferably from 0.05% to 0.1% by mass.

1. 10 Water

Examples of the water contained in the ink composition of the present embodiment include, but are not particularly limited to, ion exchange water, ultrafiltered water, reverse osmosis water, distilled water, and the like.

The ink of the present disclosure is an aqueous ink composition, and the aqueous ink composition is an ink composition containing water as at least a main solvent component of the ink.

The content of water relative to the total amount of the ink composition is preferably 50.0% by mass or more, more preferably from 50.0% to 98.0% by mass, still more preferably from 52.5% to 72.5% by mass, even still more preferably from 55% to 70% by mass, further even still more preferably from 57.5% to 67.5% by mass, and further even still more preferably from 60% to 65% by mass.

1. 11. Other Components

The ink composition of the present embodiment may contain, other than the components described above, other known components which are used in a general ink composition. Examples of the other components include, but are not particularly limited to, a solubilizer, a viscosity modifier, a pH adjuster, an antioxidant, a preservative, an anti-corrosive agent, a chelating agent for capturing predetermined metal ions, which influence dispersion, and other additives, an organic solvent other than the above, and the like. The other components may be used alone or in combination of two or more.

2. Recording Medium

Examples of a recording medium used for recording the ink composition of the present embodiment include, but are not particularly limited to, an absorptive recording medium, a low-absorptive recording medium, and a non-absorptive recording medium. Among these, the absorptive recording medium is preferred.

Examples of the absorptive recording medium include, but are not particularly limited to, plain paper such as electrophotographic paper having high ink permeability, and the like; and ink jet paper (ink jet exclusive paper having an ink absorption layer including silica particles or alumina particles, or an ink absorption layer including a hydrophilic polymer such as polyvinyl alcohol (PVA), polyvinylpyrrolidone (PVP), or the like). A fabric may also be used.

Examples of the low-absorptive recording medium include, but are not particularly limited to, art paper, coated paper, cast paper, and the like, which have relatively low ink permeability and are used for general offset printing.

Examples of the non-absorptive recording medium include, but are not particularly limited to, films and plates of plastics such as polyvinyl chloride, polyethylene, polypropylene, polyethylene terephthalate (PET), polycarbonate, polystyrene, polyurethane, and the like; plates of metals such as iron, silver, copper, aluminum, and the like; metal plates produced by vapor deposition of various metals, plastic films, and plates of alloys such as stainless, brass, and the like; a recording medium including a paper-made substrate and a film bonded (coated) thereon, using plastic such as polyvinyl chloride, polyethylene, polypropylene, polyethylene terephthalate (PET), polycarbonate, polystyrene, polyurethane, or the like; and the like.

3. Ink Jet Recording Method

An ink jet recording method the present embodiment includes an ink adhesion step of ejecting and adhering the ink composition of the present embodiment from an ink jet head to a recording medium and, if required, the method may include another step such as a transport step of transporting the recording medium.

3. 1. Ink Adhesion Step

In the ink adhesion step, the ink composition of the present embodiment is ejected and adhered from an ink jet head to a recording medium. More specifically, the ink composition filled in a pressure generating chamber of the ink jet head is ejected from nozzles by driving a pressure generating unit provided in the ink jet head.

The ink jet head used in the ink adhesion step is, for example, a line head which performs recording in a line system, and a serial head which performs recording in a serial system.

In the line system using the line head, for example, the ink jet head having a width equal to or larger than the recording width of the recording medium is fixed to a recording apparatus. Then, the recording medium is moved along the sub-scanning direction (transport direction of the recording medium), and ink droplets are ejected from the nozzles of the ink jet head in conjunction with the movement, thereby recording an image on the recording medium.

In the serial system using the serial head, for example, the ink jet head is mounted on a carriage which can be moved in the width direction of the recording medium.

Then, the carriage is moved along the main scanning direction (width direction of the recording medium), and ink droplets are ejected from the nozzles of the ink jet head in conjunction with the movement, thereby recording an image on the recording medium.

3. 2. Transport Step

The ink jet recording method of the present embodiment may include a transport step. In the transport step, the recording medium is transported in a predetermined direction in a recording apparatus. More specifically, the recording medium is transported from a paper feed portion to a paper discharge portion in the recording apparatus using a transport roller and a transport belt provided in the recording apparatus. In the transport process, the ink composition ejected from the ink jet head is adhered to the recording medium, forming a recorded matter. The ink adhesion step and the transport step may be performed simultaneously or alternately.

4. Recording Apparatus

FIGURE is a perspective view showing a serial printer as an example of an ink jet apparatus. As shown in FIGURE, a serial printer 20 includes a transport portion 220 and a recording portion 230. In the transport portion 220, the recording medium F fed to the serial printer is transported to the recording portion 230, and the recording medium F after recording is discharged to the outside of the serial printer. Specifically, the transport portion 220 has feed rollers so as to transport the sent recording medium F in the sub-scanning direction T1.

In addition, the recording portion 230 is provided with a carriage 234 mounted with an ink jet head 231 having nozzles which eject the ink composition to the recording medium F sent from the transport portion 220, and a carriage moving mechanism 235 which moves the carriage 234 in the main scanning direction S1/S2 of the recording medium F.

The serial printer is provided with, as the ink jet head 231, a head having a length smaller than the width of the recording medium, and the head is moved to perform recording in a plurality of passes (multi-pass). Also, the serial printer includes the head 231 mounted on the carriage 234 which is moved in the predetermined direction, and the head is moved in association with the movement of the carriage, thereby ejecting the ink composition to the recording medium F. Therefore, recording is performed in 2 or more passes (multi-pass). The pass is also referred to as "main scanning". In addition, sub-scanning is performed between the passes to transport the recording medium. That is, main scanning and sub-scanning are alternately performed.

The ink jet apparatus of the present embodiment is not limited to the serial-system printer described above, and may be the line-system printer described above. The line-system printer is a printer which performs recording on the recording medium by one time of scanning using the line head serves as the ink jet head having a length equal to or longer than the recording width of the recording medium.

EXAMPLES

The present disclosure is described in further detail below by examples and comparative examples. The present disclosure is not limited to examples below.

1. Preparation of Ink Jet Ink Composition

Components were added to a tank for mixing so as to obtain compositions described in Tables 1 to 3, mixed and stirred, and further filtered with a membrane filter, preparing ink jet ink compositions of examples and comparative examples. In addition, a numerical value of each of the components described in each of the examples of the tables represents "% by mass" unless otherwise specified. Also, in Tables 1 to 3, the content (% by mass) of each of the pigment, the resin-dispersed particles, the water-soluble urethane resin, the other resin, and inorganic oxide particles represents "solid content concentration".

In the tables, the ratio of soluble resin/surfactant represents the mass ratio of water-soluble urethane resin/acetylene glycol-based surfactant. The ratio of resin-dispersed particles/cyclic amide represents the mass ratio of resin-dispersed particles/lactam.

TABLE 1

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Pigment | Self-dispersing pigment | 7 | 7 | 7 | 7 | 7 | 7 | 7 | 7 | 7 | 7 | 7 |
| Resin-dispersed particle | Resin-dispersed particle 1 | 0.5 | 0.5 | 0.5 | 0.5 | 0.5 | 0.5 | 0.5 | 0.5 | 0.5 | 0.5 | 0.5 |
| | Resin-dispersed particle 2 | — | — | — | — | — | — | — | — | — | — | — |
| Water-soluble urethane resin | Urethane resin 1 | 0.5 | 0.5 | 0.5 | 0.5 | 0.5 | 0.5 | 0.5 | 0.1 | 1 | 0.5 | 0.5 |
| | Urethane resin 2 | — | — | — | — | — | — | — | — | — | — | — |
| Other resin | Water-soluble acrylic resin | — | — | — | — | — | — | — | — | — | — | — |
| Inorganic oxide particle | Cataloid SI-45P | 3 | 3 | 3 | 3 | 3 | 3 | 3 | 3 | 3 | 3 | 3 |
| Lactams | 2-Pyrrolidone | 3 | — | — | — | — | — | — | — | — | — | — |
| | 2-Piperidone | — | 3 | — | — | — | — | — | — | — | — | — |
| | ε-Caprolactam (CPL) | — | — | 3 | 1 | 5 | 3 | 3 | 3 | 3 | 3 | 3 |
| Betaine | Trimethylglycine | 7 | 7 | 7 | 7 | 7 | 7 | 7 | 7 | 7 | 10 | 5 |
| | γ-Butyrobetaine | — | — | — | — | — | — | — | — | — | — | — |
| Organic solvent | Glycerin | 10 | 10 | 10 | 10 | 10 | 10 | 10 | 10 | 10 | 10 | 10 |
| | Triethylene glycol monobutyl ether | 3 | 3 | 3 | 3 | 3 | 3 | 3 | 3 | 3 | 3 | 3 |
| | 1,2-Hexanediol | 1 | 1 | 1 | 1 | 1 | 1 | 1 | 1 | 1 | 1 | 1 |
| Acetylene glycol-based surfactant | Olfine E1010 | 0.4 | 0.4 | 0.4 | 0.4 | 0.4 | 0.1 | 0.7 | 0.4 | 0.4 | 0.4 | 0.4 |
| | Surfynol 104PG50 | 0.4 | 0.4 | 0.4 | 0.4 | 0.4 | 0.1 | 0.7 | 0.4 | 0.4 | 0.4 | 0.4 |
| Other surfactant | BYK348 | — | — | — | — | — | — | — | — | — | — | — |
| Alkali | Triethanolamine | 0.1 | 0.1 | 0.1 | 0.1 | 0.1 | 0.1 | 0.1 | 0.1 | 0.1 | 0.1 | 0.1 |
| water | Ion exchange water | Balance | Balance | Balance | Balance | Balance | Balance | Balance | Balance | Balance | Balance | Balance |
| Total | | 100 | 100 | 100 | 100 | 100 | 100 | 100 | 100 | 100 | 100 | 100 |
| Ratio of soluble resin/surfactant | | 0.63 | 0.63 | 0.63 | 0.63 | 0.63 | 2.50 | 0.36 | 0.13 | 1.25 | 0.63 | 0.63 |
| Ratio of resin-dispersed particle/cyclic amide | | 0.17 | 0.17 | 0.17 | 0.50 | 0.10 | 0.17 | 0.17 | 0.17 | 0.17 | 0.17 | 0.17 |
| Ejection reliability (intermittency) | | A | A | A | A | B | B | A | B | B | A | B |
| Ejection reliability (clogging recoverability) | | B | A | A | B | A | A | B | B | A | B | A |
| Rub resistance | | A | A | A | A | A | A | A | A | A | A | A |
| Curling resistance | | A | A | A | A | A | A | A | A | A | A | B |

TABLE 2

| | | Example | | | | | | | | | | |
|---|---|---|---|---|---|---|---|---|---|---|---|---|
| | | 12 | 13 | 14 | 15 | 16 | 17 | 18 | 19 | 20 | 21 | 22 |
| Pigment | Self-dispersing pigment | 7 | 7 | 7 | 7 | 7 | 7 | 7 | 7 | 7 | 7 | 7 |
| Resin-dispersed particle | Resin-dispersed particle 1 | — | 0.5 | 0.5 | 0.5 | 0.5 | 0.5 | 0.5 | 0.5 | — | 0.5 | 0.5 |
| | Resin-dispersed particle 2 | 0.5 | — | — | — | — | — | — | — | — | — | — |
| Water-soluble urethane resin | Urethane resin 1 | 0.5 | — | 0.5 | 0.5 | 0.5 | 0.5 | 0.5 | 0.5 | 0.5 | 5 | 0.5 |
| | Urethane resin 2 | — | 0.5 | — | — | — | — | — | — | — | — | — |
| Other resin | Water-soluble acrylic resin | — | — | — | — | — | — | — | — | — | — | — |
| Inorganic oxide particle | Cataloid SI-45P | 3 | 3 | 3 | — | 3 | 3 | 3 | 3 | 3 | 3 | 3 |
| Lactams | 2-Pyrrolidone | — | — | — | — | — | — | — | — | — | — | — |
| | 2-Piperidone | — | — | — | — | — | — | — | — | — | — | — |
| | ε-Caprolactam (CPL) | 3 | 3 | 3 | 3 | 0.5 | 10 | — | 3 | 3 | 3 | 3 |
| Betaine | Trimethylglycine | 7 | 7 | — | 7 | 7 | 7 | 7 | 7 | 7 | 7 | 15 |
| | γ-Butyrobetaine | — | — | 7 | — | — | — | — | — | — | — | — |
| Organic solvent | Glycerin | 10 | 10 | 10 | 10 | 10 | 10 | 10 | 10 | 10 | 10 | 10 |
| | Triethylene glycol monobutyl ether | 3 | 3 | 3 | 3 | 3 | 3 | 3 | 3 | 3 | 3 | 3 |
| | 1,2-Hexanediol | 1 | 1 | 1 | 1 | 1 | 1 | 1 | 1 | 1 | 1 | 1 |

TABLE 2-continued

| | | Example | | | | | | | | | | |
|---|---|---|---|---|---|---|---|---|---|---|---|---|
| | | 12 | 13 | 14 | 15 | 16 | 17 | 18 | 19 | 20 | 21 | 22 |
| Acetylene glycol-based surfactant | Olfine E1010 | 0.4 | 0.4 | 0.4 | 0.4 | 0.4 | 0.4 | 0.4 | 3 | 0.4 | 0.4 | 0.4 |
| | Surfynol 104PG50 | 0.4 | 0.4 | 0.4 | 0.4 | 0.4 | 0.4 | 0.4 | 3 | 0.4 | 0.4 | 0.4 |
| Other surfactant | BYK348 | — | — | — | — | — | — | — | — | — | — | — |
| Alkali | Triethanolamine | 0.1 | 0.1 | 0.1 | 0.1 | 0.1 | 0.1 | 0.1 | 0.1 | 0.1 | 0.1 | 0.1 |
| water | Ion exchange water | Balance | Balance | Balance | Balance | Balance | Balance | Balance | Balance | Balance | Balance | Balance |
| Total | | 100 | 100 | 100 | 100 | 100 | 100 | 100 | 100 | 100 | 100 | 100 |
| Ratio of soluble resin/surfactant | | 0.63 | 0.63 | 0.63 | 0.63 | 0.63 | 0.63 | 0.63 | 0.08 | 0.63 | 6.25 | 0.63 |
| Ratio of resin-dispersed particle/cyclic amide | | 0.17 | 0.17 | 0.17 | 0.17 | 1.00 | 0.05 | — | 0.17 | — | 0.16667 | 0.17 |
| Ejection reliability (intermittency) | | A | A | B | A | A | C | A | C | A | C | A |
| Ejection reliability (clogging recoverability) | | B | B | B | A | C | A | C | B | A | A | C |
| Rub resistance | | B | A | A | A | A | A | A | A | C | A | A |
| Curling resistance | | A | A | B | B | A | A | A | A | A | A | A |

TABLE 3

| | | Comparative Example | | | | | | | | |
|---|---|---|---|---|---|---|---|---|---|---|
| | | 1 | 2 | 3 | 4 | 5 | 6 | 7 | 8 | 9 |
| Pigment | Self-dispersing pigment | 7 | 7 | 7 | 7 | 7 | 7 | 7 | 7 | 7 |
| Resin-dispersed particle | Resin-dispersed particle 1 | 0.5 | 0.5 | — | 0.5 | 0.5 | — | 0.5 | 0.5 | 0.5 |
| | Resin-dispersed particle 2 | — | — | — | — | — | 0.5 | — | — | — |
| Water-soluble urethane resin | Urethane resin 1 | 0.5 | — | — | 0.5 | — | — | 0.5 | 0.5 | — |
| | Urethane resin 2 | — | — | — | — | — | — | — | — | — |
| Other resin | Water-soluble acrylic resin | — | — | — | — | 0.5 | — | — | — | — |
| Inorganic oxide particle | Cataloid SI-45P | 3 | 3 | 3 | 3 | 3 | 3 | 3 | — | 3 |
| Lactams | 2-Pyrrolidone | — | — | — | — | 3 | 3 | 3 | — | — |
| | 2-Piperidone | — | — | — | — | — | — | — | — | — |
| | ε-Caprolactam (CPL) | 3 | 3 | 3 | 3 | — | — | — | 3 | 3 |
| Betaine | Trimethylglycine | 7 | 7 | 7 | — | 7 | 7 | 7 | — | — |
| | γ-Butyrobetaine | — | — | — | — | — | — | — | — | — |
| Organic solvent | Glycerin | 10 | 10 | 10 | 10 | 10 | 10 | 10 | 10 | 10 |
| | Triethylene glycol monobutyl ether | 3 | 3 | 3 | 3 | 3 | 3 | 3 | 3 | 3 |
| | 1,2-Hexanediol | 1 | 1 | 1 | 1 | 1 | 1 | 1 | 1 | 1 |
| Acetylene glycol-based surfactant | Olfine E1010 | — | 0.4 | 0.4 | 0.4 | 0.4 | 0.4 | — | 0.4 | 0.4 |
| | Surfynol 104PG50 | — | 0.4 | 0.4 | 0.4 | 0.4 | 0.4 | — | 0.4 | 0.4 |
| Other surfactant | BYK348 | — | — | — | — | — | — | 0.8 | — | — |
| Alkali | Triethanolamine | 0.1 | 0.1 | 0.1 | 0.1 | 0.1 | 0.1 | 0.1 | 0.1 | 0.1 |
| water | Ion exchange water | Balance | Balance | Balance | Balance | Balance | Balance | Balance | Balance | Balance |
| Total | | 100 | 100 | 100 | 100 | 100 | 100 | 100 | 100 | 100 |
| Ratio of soluble resin/surfactant | | — | — | — | 0.63 | — | — | — | 0.63 | — |
| Ratio of resin-dispersed particle/cyclic amide | | 0.17 | 0.17 | — | 0.17 | 0.17 | 0.17 | 0.17 | 0.17 | 0.17 |
| Ejection reliability (intermittency) | | D | C | C | D | C | C | D | D | D |
| Ejection reliability (clogging recoverability) | | B | D | D | A | D | D | B | A | B |
| Rub resistance | | C | A | C | A | A | A | A | A | A |
| Curling resistance | | A | A | A | B | A | A | A | C | B |

The materials described in Tables 1 to 3 are as follows.

Pigment

CAB-O-JET 300 (manufactured by Cabot Corporation, solid content; 15%)

Resin-Dispersed Particles

Resin-dispersed particles 1: "Vinyblan 2586" (manufactured by Shin-Etsu Chemical Co., Ltd., acrylic resin emulsion)

Resin-dispersed particles 2: "Super Flex 420" (manufactured by DSK Co., Ltd., urethane-based resin emulsion)

Water-Soluble Urethane Resin

Water-soluble urethane resin 1

The water-soluble urethane resin 1 was prepared by the following method.

First, a four-neck flask provided with a stirrer, a thermometer, a nitrogen gas inlet tube, and a reflux tube was prepared. In the four-neck flask, 41.7 parts by mass of isophorone diisocyanate, 40.1 parts by mass of polypropylene glycol (number-average molecular weight: 2,000), 13.2 parts by mass of dimethylol propionic acid, and 200.0 parts by mass of methyl ethyl ketone were added and reacted at 80° C. for 6 hours in a nitrogen gas atmosphere (primary reaction). Then, 0.6 parts by mass of ethylenediamine, 2.0 parts by mass of methanol, 2.4 parts by mass of dimethylol propionic acid, and 100.0 parts by mass of methyl ethyl ketone were added. The residual ratio of isocyanate groups was confirmed by FT-IR, and then reaction was performed at 80° C. until a desired residual ratio was obtained (secondary reaction), obtaining a reaction solution. After the resultant reaction solution was cooled to 40° C., ion exchange water was added, and an aqueous potassium hydroxide solution was added under high-speed stirring by a homomixer. Then, methyl ethyl ketone was distilled off from the resultant solution by heating under reduced pressure, producing a liquid containing the water-soluble urethane resin 1.

With respect to the resultant water-soluble urethane resin 1, the liquid containing the water-soluble urethane resin 1 was precipitated by adding hydrochloric acid to the liquid containing the water-soluble urethane resin 1 and then dried under vacuum at 40° C. overnight. The resultant resin was dissolved in tetrahydrofuran to prepare a sample. As a result of measurement of the acid value of the water-soluble urethane resin 1 by potentiometric titration using a potassium hydroxy-methanol titrant, the acid value was 65 mgKOH/g.

Also, with respect to the water-soluble urethane resin 1, the weigh-average molecular weight of the urethane resin in terms of polystyrene, measured by gel permeation chromatography (GPC), was about 21000.

Water-soluble urethane resin 2

The water-soluble urethane resin 2 was prepared by the same preparation method as for the water-soluble urethane resin 1 except that in preparing the water-soluble urethane resin 1, the amount of the polypropylene glycol added was decreased, and the amounts of dimethylol propionic acid added in the primary reaction and secondary reaction were increased. As a result of measurement of the acid value and weight-average molecular weight by the same measurement methods as for the water-soluble urethane resin 1, the acid value of the water-soluble urethane resin 2 was 75 mgKOH/g, and the weight-average molecular weight was about 21000.

Other Resin

Water-soluble acrylic resin

The water-soluble acrylic resin was prepared by the following method.

A four-neck flask provided with a stirrer, a thermometer, a reflux condenser, and a nitrogen gas inlet tube was prepared. In the four-neck flask, 200.0 parts by mass of ethylene glycol monobutyl ether was placed and heated to 130° C. under stirring in a nitrogen gas atmosphere. Then, 62.0 parts by mass of styrene monomer, 22.0 parts by mass of butyl acrylate, 16.0 parts by mass of acrylic acid, and 4.0 parts by mass of a polymerization initiator (tert-butyl peroxide) were dropped over 3 hours. After aging for 2 hours, ethylene glycol monobutyl ether was distilled off under reduced pressure, producing the water-soluble acrylic resin.

Inorganic Oxide Particles

"Cataloid SI-45P" (manufactured by Nikki Shokubai Kasei Co., Ltd., silica particle-dispersed sol, average particle diameter: 45 nm)

Lactam

2-Pyrrolidone

2-Piperidone

ε-Caprolactam (CPL)

Betaine

Trimethylglycine

γ-Butyrobetaine

Organic Solvent

Glycerin

Triethylene glycol monobutyl ether 1,2-Hexanediol

Acetylene Glycol-Based Surfactant

"Olfine E1010": manufactured by Nissin Chemical Industry Co., Ltd., acetylene glycol-based surfactant, a compound of the formula (1) in which $—OR^3$ and $—OR^{3'}$ are each an alkylene oxide group.

"Surfynol 104PG50": manufactured by Air Products Japan, Inc., acetylene glycol-based surfactant, a compound of the formula (1) in which $—OR^3$ and $—OR^{3'}$ are each —OH.

Other Surfactant

"BYK 348": manufactured by BYK Chemie Japan K. K., silicone-based surfactant

Alkali

Triethanolamine

Water

Ion exchange water

2. Evaluation

2. 1. Ejection Reliability (Intermittency)

A test pattern was recorded on a recording medium (A4-size Xerox P paper, copy paper manufactured by Fuji Xerox Co., Ltd., basis weight: 64 $g/m^2$, paper thickness: 88 μm) with an ink adhesion amount of 4 $mg/inch^2$ in a state where a modified machine of ink jet recording apparatus LX-10050MF (manufactured by Seiko Epson Corporation) was filled with each of the ink compositions of the examples and the comparative examples. Then, after idle running for 10 minutes in a state where the ink jet head was filled with the ink composition, a test pattern was recorded under the same conditions as described above. A deviation of landing position of the ink composition on the recording medium before and after idle running was calculated by comparison between the two test patterns obtained as described above, and evaluated according to evaluation criteria below. The evaluation results are shown in Tables 1 to 3.

Evaluation Criteria

A: The landing position deviation is 0 μm or more and less than 50 μm.

B: The landing position deviation is 50 μm or more and less than 100 μm.

C: The landing position deviation is 100 μm or more and less than 200 μm.

D: The landing position deviation is 200 μm or more.

2. 2. Ejection Reliability (Clogging Recoverability)

Confirmation was made that the ink could be ejected from all nozzles in a state where a modified machine of ink jet recording apparatus LX-10050MF (manufactured by Seiko Epson Corporation) was filled with each of the ink compositions of the examples and the comparative examples. Then, the machine was allowed to stand for 7 days in the environment of 40° C. and a relative humidity of 20% in a state where the ink jet head was deviated from the position of the cap provided in the ink jet head and was not capped.

After being allowed to stand, recording was performed by the same method as described above while an operation of sucking the ink in the nozzles was repeated for cleaning the ink jet head. Then, non-ejection and the occurrence of landing position deviation were evaluated according to evaluation criteria below based on the number of times of cleaning at the time of recovery of all nozzles. The evaluation results are shown in Tables 1 to 3.

Evaluation Criteria

A: Within 3 times of cleaning, ejection from all nozzles is observed, and landing position deviation does not occur.

B: With 4 to 6 times of cleaning, ejection from all nozzles is observed, and landing position deviation doss not occur.

C: With 4 to 6 times of cleaning, ejection from all nozzles is observed, but landing position deviation occurs.

D: With 4 to 6 times of cleaning, non-ejection nozzles are present.

2. 3. Rub Resistance (Line Marker Resistance)

A solid pattern of 20 mm×20 mm was recorded on a recording medium using the same apparatus and recording medium as described above. Immediately after recording, the recording medium was fixed to a horizontally installed flat surface, and 5 minutes after recording, a character portion was rubbed with a line marker "OPTEX CARE" (manufactured by Zebra Co., Ltd.). Then, the rub resistance was evaluated according to evaluation criteria below based on the degree of ink blurring. The evaluation results are shown in Tables 1 to 3.

Evaluation Criteria

A: Color blurring does not occur even by 2 times of rubbing.

B: Color blurring does not occur even by 1 time of rubbing, but color blurring occurs by 2 times of rubbing.

C: Color blurring occurs by 1 time of rubbing.

2. 4. Curling Resistance

A solid pattern was recorded with a printing duty of 100% using the same apparatus and recording medium as described above in an environment at a temperature 25° C. and a relative humidity of 50%. The curling resistance was evaluated according to evaluation criteria below based on the primary curling and secondary curling of the resultant paper. The evaluation results are shown in Tables 1 to 3. The definitions of primary curling and secondary curling are as follows.

Primary Curling

When the paper after printing was allowed to stand face down, the angle between the installation point of the paper and the floor surface and the end of the paper was measured. When the angle was equal to or larger than the maximum curl angle of 90°, it was considered that primary curling was present.

Secondary Curling

When the paper after printing was allowed to stand face down for 2 weeks, the amount of rising of the end of the paper from the floor surface was measured. When the amount of rising was 10 mm or more, it was considered that secondary curling was present.

Evaluation Criteria

A: Any one of primary curling and secondary curling is not observed.

B: Either primary curling or secondary curing is observed.

C: Both primary curling and secondary curling are observed.

3. Evaluation Results

The evaluation results of Tables 1 to 3 reveal that any one of Examples 1 to 22 is excellent in intermittency and clogging recoverability as compared with Comparative Examples 1 and 7 not containing the acetylene glycol-based surfactant, Comparative Examples 2, 3, 5, 6, and 9 not containing the water-soluble urethane resin, and Comparative Examples 4 and 8 not containing the betaine.

Although not described in the tables, a test was performed by the same method as in Example 1 except that in Examples 1, the content of Surfynol 104PG50 was 0.7% by mass, and the content of Olfine E1010 was 0.1% by mass. As a result, the clogging recoverability was evaluated as "C", but the ink had excellent permeability to the recording medium and more excellent color development, and was thus more useful.

What is claimed is:

1. An aqueous ink jet ink composition comprising:
a coloring material;
a betaine;
an acetylene glycol-based surfactant; and
a water-soluble urethane resin,
wherein a content of the water-soluble urethane resin is from 0.05% to 0.8% by mass relative to a total amount of the ink jet ink composition.

2. The ink jet ink composition according to claim 1, wherein the content of the betaine is from 3.0% to 13% by mass relative to the total amount of the ink jet ink composition.

3. The ink jet ink composition according to claim 1, wherein the content of the water-soluble urethane resin is from 0.1% to 0.8% by mass relative to the total amount of the ink jet ink composition.

4. The ink jet ink composition according to claim 1, wherein the content of the acetylene glycol-based surfactant is from 0.1% to 5.0% by mass relative to the total amount of the ink jet ink composition.

5. The ink jet ink composition according to claim 1, wherein the water-soluble urethane resin contains a water-soluble urethane resin having an acid group.

6. The ink jet ink composition according to claim 1, wherein the ratio of the content of the water-soluble urethane resin to the content of the acetylene glycol-based surfactant is from 0.1 to 2.5.

7. The ink jet ink composition according to claim 1, wherein the coloring material contains any one or more of a self-dispersing pigment and a pigment dispersed by a dispersant resin.

8. The ink jet ink composition according to claim 1, further comprising:
any one or more of a resin-dispersed particle and an inorganic oxide particle; and
a lactam,
wherein the lactam contains lactam A having 4 to 6 carbon atoms that form a lactam ring.

9. The ink jet ink composition according to claim 8, wherein the ratio of the content of the resin-dispersed particle to the content of the lactam A is from 0.1 to 0.5.

10. The ink jet ink composition according to claim 8, wherein the lactam A contains ε-caprolactam.

11. The ink jet ink composition according to claim 1, further comprising an organic solvent,
wherein the organic solvent contains a polyol having a standard boiling point of over 280° C.

12. The ink jet ink composition according to claim 1, wherein, the ink jet ink composition is used for recording on an absorptive recording medium.

13. A recording method comprising:

an ink adhesion step of ejecting and adhering the ink jet ink composition according to claim 1 from an ink jet head to a recording medium.

* * * * *